(No Model.)
H. E. FRIES.
HAND PLANTER AND DISTRIBUTER.
No. 337,390. Patented Mar. 9, 1886.
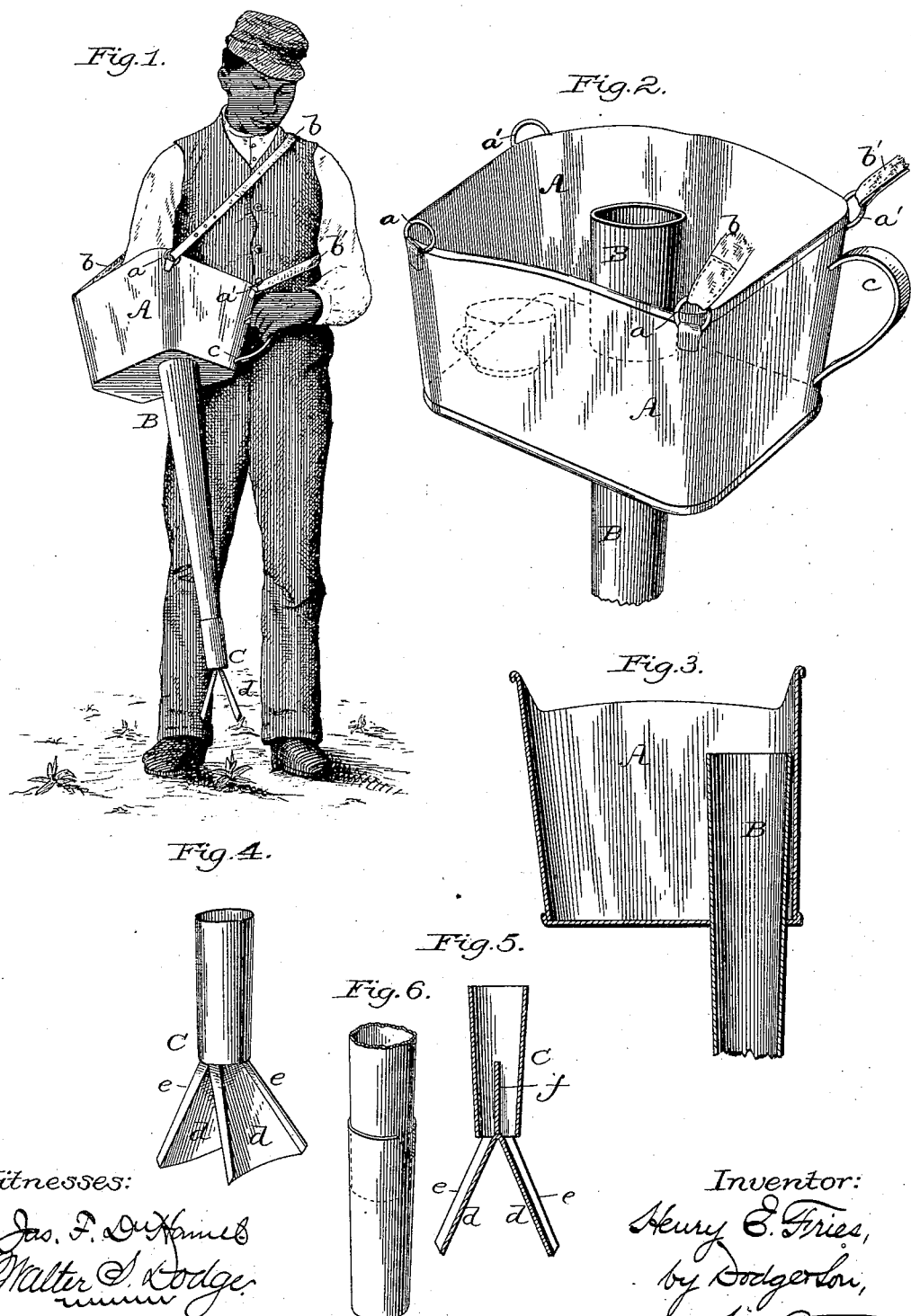

UNITED STATES PATENT OFFICE.

HENRY E. FRIES, OF SALEM, NORTH CAROLINA.

HAND PLANTER AND DISTRIBUTER.

SPECIFICATION forming part of Letters Patent No. 337,390, dated March 9, 1886.

Application filed August 13, 1885. Serial No. 174,244. (No model.)

*To all whom it may concern:*

Be it known that I, HENRY E. FRIES, of Salem, in the county of Forsyth and State of North Carolina, have invented certain new and useful Improvements in Hand Planters and Distributers, of which the following is a specification.

This invention relates to that class of implements commonly known as "distributers and planters," and is designed for planting bulbs, seeds, or grains, and also for distributing fertilizer.

In the drawings, Figure 1 is a perspective view of my improved device in use; Fig. 2, a perspective view detached; Fig. 3, a vertical cross-section; and Figs. 4, 5, and 6, views illustrating certain details.

Heretofore it has been proposed to provide hand-distributers with a delivery-tube, which extended upward above the top of the body of the distributer, into which the material was fed.

The principal object of my invention is to secure uniformity in the amount of material distributed. Where the tube extends up above the top of the receptacle a portion of the material is poured back into the latter and a portion outside of the same. Under my plan this irregularity in the feed is avoided, as the edge of the cup or feeding device is placed in the mouth of the tube and the entire contents poured into the latter, thus avoiding waste. The material cannot be poured over the outside, for the reason that the cup or other feeding device is not raised that high, and it is not liable to be poured inside, because by placing the cup in the mouth of the tube the hand is steadied.

A indicates a vessel or receptacle of substantially rectangular form, the shape of which may, however, be varied as desired, open at the top or upper side, and through the bottom of which passes a tube, B, extending from near the top of the vessel A downward a considerable distance nearly to the feet of the user, as indicated in Fig. 1. The vessel is provided with two sets of rings or loops, $a a'$, at its upper corners, adapted to receive the straps $b b'$, passing, respectively, over the shoulders and around the waist of the wearer. In this manner the distributer is securely fastened upon the body and can be readily adjusted to various sizes of persons or for plants.

In order to steady the distributer it is in some cases provided with a handle, $c$, at one corner, by which the person using the device may move it about as becomes necessary or desirable.

As shown in Fig. 3, the tube B does not extend up to the top of the vessel A, as has heretofore been done, for the reason that in raising the fertilizer or seeds up to place them in the delivery-tube, the wind blowing across the top of the vessel, scatters the material and entails loss and inequality of delivery. Such plan, while satisfactory in a potato-planter and other planters where the material used is heavy, will not do for planting cotton and other light seed, for the reason that when the latter is being poured into the tube the wind scatters it broadcast.

In my distributer, where the top of the tube is below the top of the vessel, the material does not have to be raised so high as to be affected by the wind, and thus wasting is obviated. The tube may pass out through the center of the vessel A, or from any other point; but I prefer that it should pass out near one corner, as indicated in Fig. 1, as it enables the attendant to see where the material is being distributed, and gives more room for the cup or measuring device used.

In order that the plants may not be covered up or injured, and that the material may not be wasted when distributing fertilizer, it is found necessary to provide the discharge end of the tube B with a spreader, C. (Shown in Figs. 1, 4, and 5.) The spreader has two laterally-extending inclined wings or plates, $d$, with their edges turned up to form flanges $e$, to prevent the material from falling off the sides. The wings or plates $d$ may be made flat or concaved slightly, as thought best, and are soldered or otherwise secured to a vertical dividing-plate, $f$, secured to the inside of the delivery-tube, as shown in Fig. 5. The plate $f$ serves not only to support the spreader, but divides the material falling through the tube, and delivers the same amount to each side.

The distributer is preferably made of tin; but it obviously may be made of any other suitable material, and its form varied as desired. The tube B is made slightly conical or tapering, to receive the material more readily, and the spreader C has its tubular body made to fit snugly upon the lower end of said tube, so as to be retained in place by friction. This permits ready removal. Detachable tubular extensions may be likewise provided to permit the length of tube to be adapted to the person using the device, or to the height of plants, &c. Such extension-piece is shown in Fig. 6.

It is to be observed that the spreader being open at the middle may be placed directly over a small plant without injury thereto.

Having thus described my invention, what I claim is—

1. In a hand-distributer, the combination of a vessel open at its top and a delivery-tube passing through the bottom and terminating a short distance below the top, for the purpose set forth.

2. In a hand-distributer, the combination of vessel A, tube B, and spreader C, composed of wings or plates $d$ and $f$, as and for the purpose set forth.

3. In combination with vessel A and its tube B, a detachable spreader consisting of the dividing-plate $f$ and lateral wings $d$.

HENRY E. FRIES.

Witnesses:
EUGENE E. GRAY,
C. S. POOL.